Jan. 5, 1926.  
E. O. AEGERTER ET AL  
VISION SHIELD  
Filed Oct. 4, 1922  
1,568,200  
5 Sheets-Sheet 3
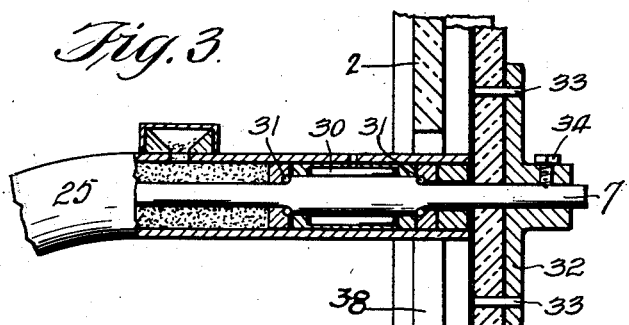
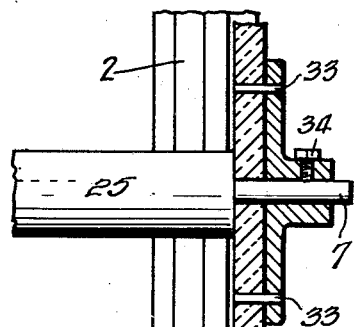
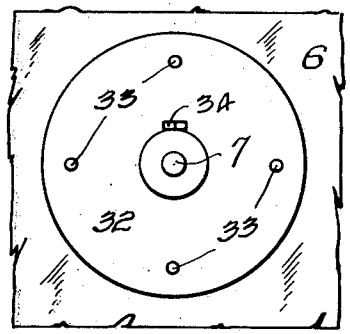
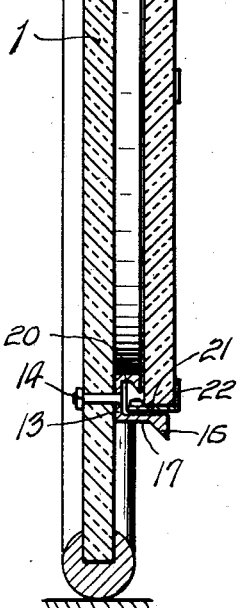
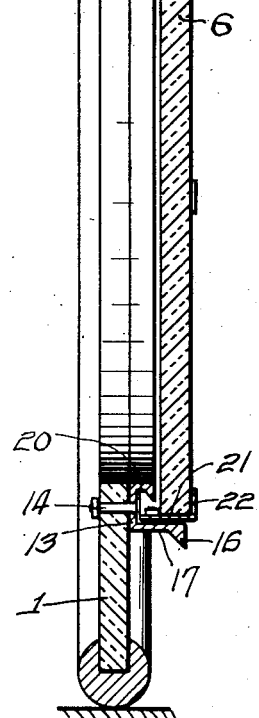
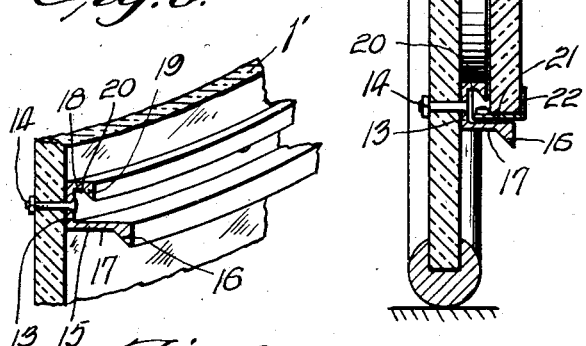
Inventors:  
Erwin O. Aegerter.  
Gustave W. Aegerter.  
By Fred'k J. Larson  
Attorney.

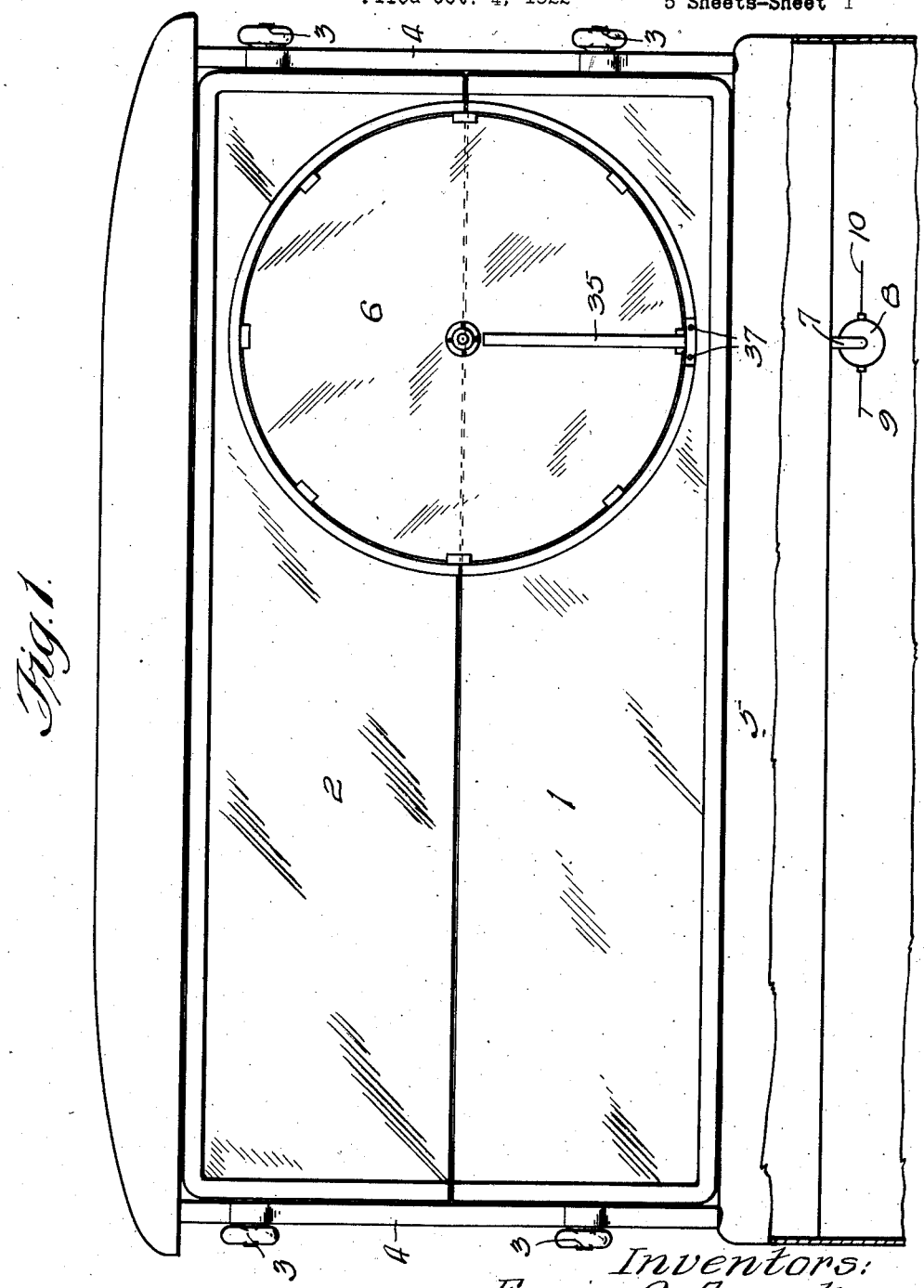

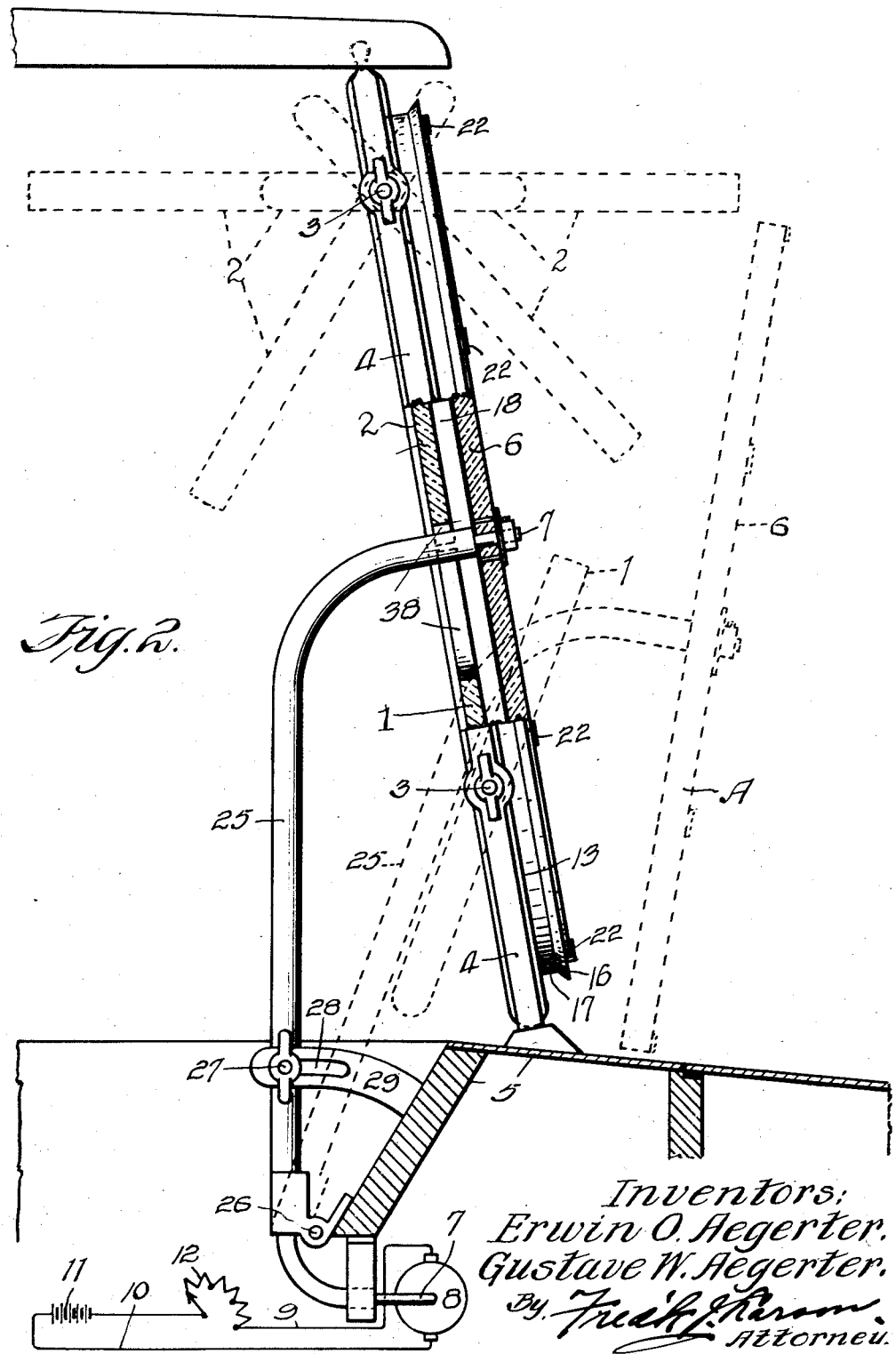

Jan. 5, 1926.　　　　　　　　　　　　　　　　1,568,200
E. O. AEGERTER ET AL
VISION SHIELD
Filed Oct. 4, 1922　　　5 Sheets-Sheet 4

Inventors:
Erwin O. Aegerter.
Gustave W. Aegerter.
By Fred'k Charson
Attorney.

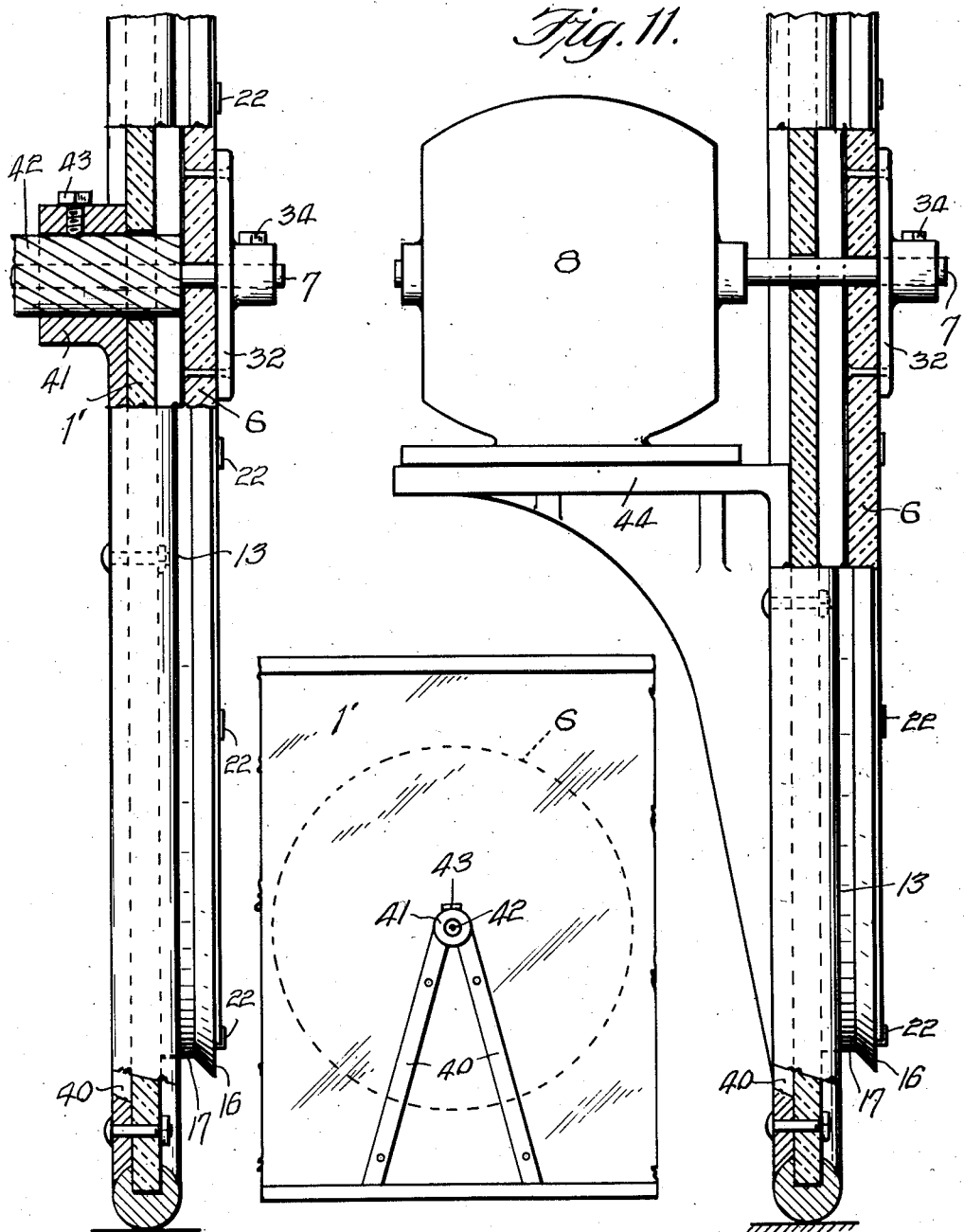

Patented Jan. 5, 1926.

1,568,200

UNITED STATES PATENT OFFICE.

ERWIN O. AEGERTER AND GUSTAVE W. AEGERTER, OF ST. LOUIS, MISSOURI.

VISION SHIELD.

Application filed October 4, 1922. Serial No. 592,273.

*To all whom it may concern:*

Be it known that we, ERWIN O. AEGERTER and GUSTAVE W. AEGERTER, citizens of the United States, residing in the city of St. Louis and State of Missouri, have invented a certain new and useful Vision Shield, of which the following is a specification.

Our invention relates to a vision shield for automobiles, street cars, locomotives, light houses, observation towers, and, in fact is susceptible of use whenever clear vision is desired, during rain, snow, sleet storms and the like and for the purpose of throwing insects off of the wind shield of a motor vehicle, or craft.

The primary object of our invention is to provide a vision shield, capable of being rotated when subjected to water, sleet, snow, or insects, so as to keep the surface thereof which is exposed to the elements, clean, dry and free of the elements, both through centrifugal force applied to the elements and evaporation of the elements capable of evaporation.

A further object of the invention is to provide a rotary vision shield capable of being used, in combination, with a pane of glass, such as a window, wind shield for vehicles, crafts and the like, and all transparent closures used for the purpose of observation, as in light houses, signal towers, etc. etc.

A still further object of the invention is the provision of means for supporting the vision shield adjacent another vision element which is capable of movement, so that the rotary vision shield will move outwardly or inwardly therewith as well as rotate with respect thereto.

A still further object of the invention is the provision of means for permitting the movement of the rotary vision shield toward or away from another vision element with which it may be associated.

A still further object of the invention is the provision of means for rotating the vision shield.

A still further object of the invention is the provision of means for substantially sealing the peripheral edge of the rotary vision shield to prevent insects, rain, sleet, snow or other elements from finding access to the inner surface of the rotary shield or the surface of a vision element situated to the rear of the rotary vision element.

With the above and other objects in view, the invention consists in the novel features of construction, arrangement and combination of parts hereinafter more fully described and finally pointed out in the claims hereto appended.

Referring to the accompanying drawings forming a part of this specification, wherein like characters of reference denote similar parts throughout the several views:

Fig. 1, is a front elevation of our rotary vision shield applied to the wind shield of a vehicle.

Fig. 2, is a view, partly in side elevation and partly in sectional elevation, showing a standard two piece wind shield applied to a vehicle, our rotary vision shield and its connections.

Fig. 3, is a detail, in sectional elevation, of a portion of a main vision shield, showing the application of the rotary vision shield thereto and the means for rotating same.

Fig. 4, is a detail in front elevation, of the means for fastening the rotary vision shield to a driven shaft.

Fig. 5, is a detail, in perspective, of a portion of a rotary vision shield showing its peripheral band.

Fig. 6, is a detail, in perspective, of a portion of a vision member to which is attached an annular guard to prevent passage of the elements, insects and the like to the rear of the rotary vision shield.

Fig. 7, is a view similar to Fig. 3, with the exception that the area of the rear vision member directly to the rear of the rotary vision member is cut away, thus obviating the necessity of having to look through two panes of glass.

Fig. 9, shows a modified form of bracket for supporting the flexible driven shaft.

Fig. 10, is a front elevation thereof.

Fig. 11, is a modification showing the bracket as a support for the motor for driving the rotary shield.

Figure 8:
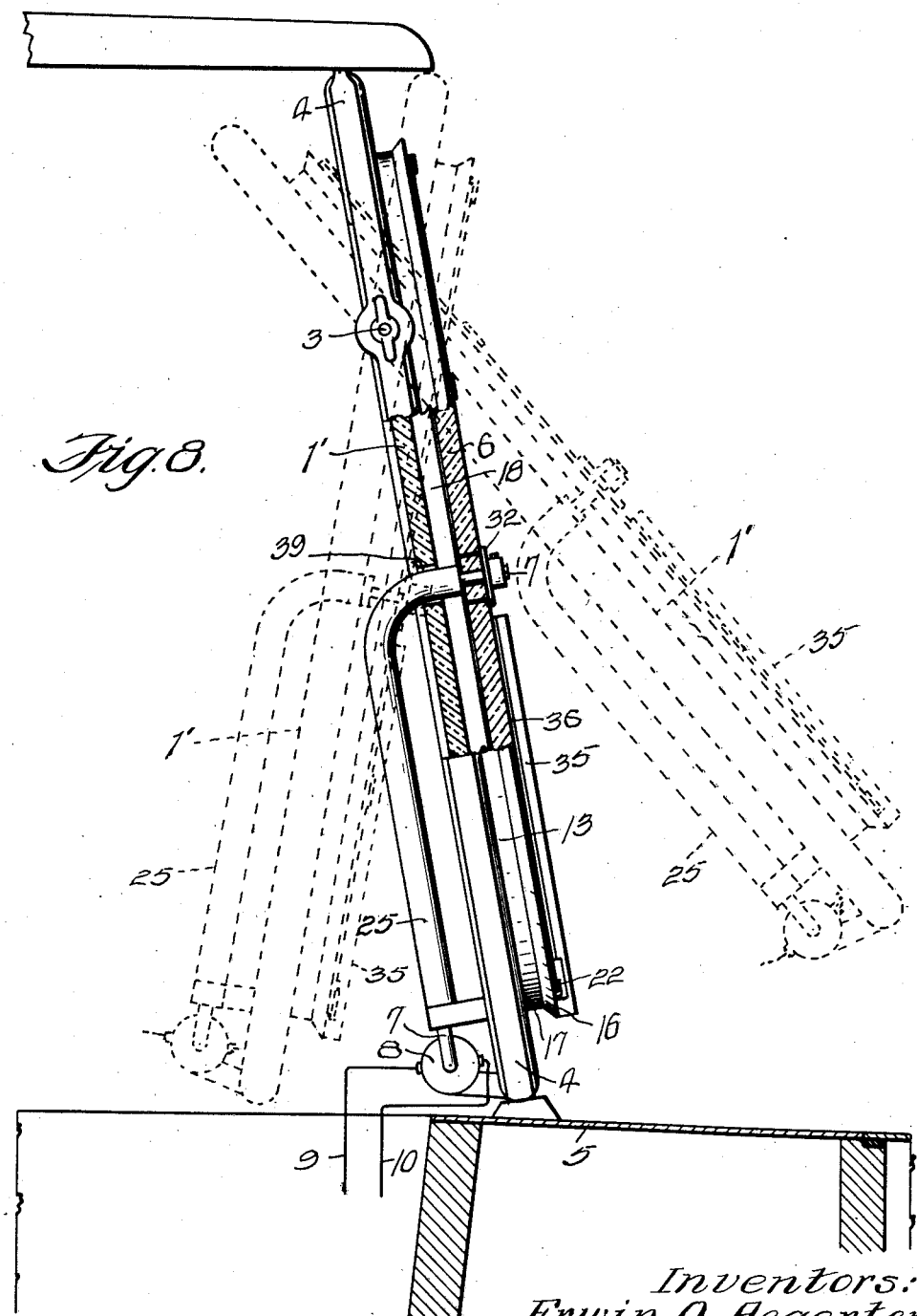
Fig. 8, is a slight modification of the invention, showing the rotary shield, its supporting member, and the source of power for rotating the shield, as supported by the rear vision member and movable therewith, instead of movable independent thereof, as shown in Fig. 2

For the purpose of illustration only, we have shown in the drawings, the application of our rotary vision shield to a motor vehicle wind shield, although it may be well to here state, that our invention is applicable to windows, movable or stationary, and to transparent vision means of all kinds, an area of which is to be kept free, dry and clear of the weather elements, such as rain, snow, sleet and of insects.

In the drawings, especially in Fig. 1, we have shown a standard type of two piece wind shield, consisting of the lower shield member 1 and the upper shield member 2 which are movably supported by pivot means 3 carried by the usual side frame members 4, which, in turn, are usually supported by the cowl of a vehicle, or craft designated 5. In the modification shown in Fig. 8, the single wind shield member designated 1' is supported by opposed pivot members 3 carried by the usual frame members 4.

In carrying out the aim of our invention, we employ a transparent vision shield 6 preferably of glass, although not necessarily limited thereto, as other suitable transparent material may be employed, if desired. The vision shield 6 is preferably circular in front or rear elevation and is suitably attached centrally to one end of a suitable shaft 7, preferably flexible, although not necessarily limited thereto, as a non-flexible shaft can be employed under certain conditions. The other end of the shaft is preferably connected in any suitable manner to the armature shaft of an electric motor 8 to be driven thereby for imparting rotary movement to the vision shield 6. While we have illustrated the motor 8 as driven through the medium of electric energy carried by conductors 9 and 10 from a source of electrical supply, such as a battery 11 and controlled through the medium of a rheostat 12, or a suitable switch, it is apparent that other power may be employed for rotating the shaft 7 to which the shield 6 is attached, such for instance as manual, or by spring motor power. The particular source of power for actuating the driven shaft 7 for imparting rotary movement to the vision shield 6 is not so important, as it is well known that various means may be employed for rotating the transparent vision disc, or shield 6.

The rotary vision shield 6 is disposed to the outer face of a single, or two piece vision device, as will be observed from Figs. 1, 3, 7 and 8 of the drawings, and, the rotary shield 6 is spaced in advance thereof a suitable distance, as is apparent from the drawings.

An annular guard designated 13 is suitably fixed by any well known fastening means, designated 14, to the outer face of the wind shield, which when used on a two piece wind shield, is composed of two semi-annular segments and when used upon a single pane of glass is formed of a single annular element. The annular guard 13 lies adjacent and in very close proximity to the periphery of the rotary shield member 6 and the outer laterally directed member 15 thereof is provided with an outwardly directed tapered terminal flange 16 to form a peripheral channel 17 to establish a positive outer or peripheral drain for the annular guard, as clearly shown in Fig. 6. The annular guard 13 is also provided with an inner laterally directed flange 18 which lies parallel to flange 15 and terminates in an outwardly directed tapered flange 19 to establish an internal annular drain 20 for the annular guard, as will be clearly understood from Fig. 6, of the drawing. A suitable metallic rim or band 21 is suitably fixed to the peripheral face of the rotary shield member 6 and this rim assumes a position in very close proximity to the inner face of the outer flange 15 of the annular guard 13, as clearly shown in Figs. 3 and 7. The rotary shield rim 21 extends inwardly beyond the inner face of the shield member 6 with the inner plane thereof disposed opposite the internal annular drain 20 so that any elements thrown from the inner edge of the rim 21 will be received by the internal drain 20, thus preventing its dispatch to the outer face of the wind shield proper, or other vision element, which lies to the rear of the rotary vision shield 6, as will be apparent from Figs. 3 and 7. We have shown in Fig. 5, one method of fastening the rim 21 to the periphery of the rotary vision shield 6. In this method of fastening the rim to the rotary shield, the rim 21 is provided along its outer edge with a plurality of suitably spaced inwardly directed clips or lips 22 adapted to engage the outer face of the rotary vision shield 6 near its edge which prevents inward movement of the rim upon the shield, and, the rim is held from outward displacement by means of the nut 23 engaging the inner face of the rotary vision shield 6 and held by a screw member 24.

As shown in Figs. 2 and 8, a tubular casing member 25 is preferably employed for the reception of the driven shaft 7, whether flexible, or non-flexible. The casing 25, when used in connection with a two piece wind shield proper, is hingedly connected at its lower end, as at 26, to the instrument board of the vehicle, or craft, or to the cowl 5 thereof, if preferred, which acts as a support for the casing 25 and rotary shield 6, as is manifest. The rotary vision shield 6 is held in its adjusted position with relation to the annular guard 13, by means of a suitable fastening device 27 carried by the casing 25 and passing through a slotted passage 28 in a guide bracket 29, which bracket may be attached to the instrument board or cowl of the vehicle, or craft, if desired as shown in Fig. 2. When the rotary vision shield 6 is used in connection with a single piece wind shield, or window pane, as shown in Fig. 8, the casing 25 is preferably suitably attached at its lower end to the wind shield proper so that the rotary vision shield 6 will be held in fixed spaced relation to and in advance of the vision element proper and movable therewith, instead of independent thereof, as with a two piece wind shield, or similar vision members, as shown in Figs. 1 and 2.

Referring back to the driven shaft 7, it will be observed from Fig. 3, of the drawings, that the shield end of the shaft 7 is preferably provided with a set of roller bearings 30 and with the end or thrust bearing 31, the latter being employed to prevent longitudinal movement of the shaft to which the vision shield 6 is attached, thus holding the vision shield 6, at all times, in a predetermined spaced position with relation to the rear vision shield. The rotary vision shield is preferably, although not necessarily attached to a flanged bearing member 32 by means of suitable fastening devices 33. The bearing member 32 is suitably fixed to the drive shaft 7 by means of suitable fastening device 34.

In Figs. 1 and 8, it will be observed that we have shown a suitable squeegee, or wiper designated 35, which device is suitably supported in advance of the rotary vision shield 6 and with the rubber wiping member 36 thereof in contact with the outer or exposed surface of the shield 6 for the purpose of progressively wiping the exposed surface of the shield 6 to aid, if desired, in the freeing of the exposed surface of water, rain, sleet, insects, etc. The wiper 35 is not, in any sense, a necessity to the success of the rotary shield, but may or may not be used therewith, as desired. The wiper 35 may be supported in several ways, but is illustrated only as suitably fixed at its lower end to the annular guard 13 by suitable fastening devices 37. When the wiper 35 is applied to an annular guard it will be understood that the rotary shield 6 can not be moved forwardly with relation to the annular guard carried by a shield until the wiper 35 has been first removed or detached from the annular guard owing to the fact that its presence would not permit movement of the rotary shield 6 to a forward position, as shown in Fig. 2.

When a wiper 35 is applied to an annular guard which is fixed to a one piece shield member, as shown in Fig. 8, it will be observed that it will not be necessary to remove the wiper from the annular guard as the spaced position of the rotary shield is in fixed relation with the shield member 1'; thus the rotary shield is only capable of movement with the shield proper designated 1'.

By reference to Fig. 2, which is illustrative of a rotary vision shield applied to a two piece wind shield it will be observed that by moving the rotary shield 6 forward from its normal position shown in Fig. 2, in full lines to the position shown in dotted lines and designated A, that the upper wind shield member 2 may be swung into various positions with relation to its support and the rotary vision shield 6, as indicated in dotted lines. Likewise, when the rotary shield 6 is in its forwardmost position that the lower wind shield member 1 can also be swung into various positions upon its pivots, as indicated in dotted lines. Thus, it will be seen that the application of a rotary shield 6 to a two piece vehicle wind shield is practical, not in the way of movements of the wind shield sections proper for permitting the passage of air to the rear thereof, and that when the rotary shield 6 is in its normal position and in operation, that an area of the wind shield proper as large as the rotary shield will be kept free from water, snow, sleet or ice, owing to the fact that the elements will be quickly dissipated by centrifugal force and evaporation leaving the surface of the rotary shield clean and dry in the heaviest of rain storms, thus insuring clear and perfect vision for the operator behind the shield. In the embodiment of the invention illustrated in Fig. 2, it will be evident that the rotary vision shield is movable into various positions with relation to the wind shield member proper and that when the rotary shield is in its forwardmost position that the wind shield members are adjustable to various positions as usual. The upper end of the tubular casing and support passes through slotted opening 38 in the wind shield sections 1 and 2.

By reference to Fig. 8 of the drawings, which illustrates a one piece wind shield, or a sash of any kind, it will be observed that the rotary vision shield 6 is held in fixed relation to the wind shield proper, excepting as to the rotation thereof, owing to the fact that the means 25 supporting the shield 6, is supported at its lower end by the one piece shield, or by its sash or frame, and, is thus movable therewith into any position the shield or window is moved. The upper end of the support 25 in a one piece shield passes through an opening 39 therein.

By reference to Figs. 9 and 10, it will be observed that we eliminate the flexible shaft casing 25, shown in Figures 2 and 8, and substitute therefor a suitably shaped bracket 40 which bracket is suitably fixed to the shield 1' or 1'', or when used in connection with a window, the bracket 40 can be fixed to the sash frame thereof. The bracket 40 is provided with a bearing 41 at its upper end to receive and support the upper end of a universal flexible shaft casing designated 42. The casing is held in fixed relation to the bearing by means of a suitable fastening device 43.

By reference to Fig. 11, it is apparent that where we wish to eliminate the use of a flexible shaft and its casing, that we provide the bracket 40 with a shelf 44 in lieu of the bearing 41 shown in Figs. 9 and 10 and mount the motor 8 upon the shelf 44 and attach the rotary shield directly to the armature shaft of the motor, thus permitting the motor to be mounted in close proximity of the rotary shield 6, instead of remote therefrom, as is apparent from Figs. 1, 8 and 9.

It will be apparent that when the shield 6 is in rotation, that the elements are thrown off of the face of the shield as quickly as they contact therewith and that to permit the free escape of the elements from the face of the shield, the outer face of the shield 6 is positioned slightly in advance of the outer face of the annular guard which lies in close proximity of the periphery of the shield 6. The clips or lips 22 being in spaced relation offer little or no obstruction to the ready escape of the elements from the outer surface of the shield when the shield is in rotation, and, the annular guard being set back from the front plane of the shield, the elements will not be thrown against the annular guard, as is apparent from the drawings.

It will be here observed, that the annular guard 13 is applied to the wind shield member in such a manner as to provide a water tight joint or union between the rear face of the annular guard 13 and the windshield to keep water from entering upon the inner face of the wind shield proper to the rear of the rotary shield 6, as clearly shown in Fig. 6.

Likewise, the rim or band 21 of the rotary transparent shield 6 is applied to the periphery of the shield, or disc 6 so as to provide a watertight joint or union therebetween, as clearly shown in Fig. 5.

While we have illustrated in Figs. 1 and 2, for the purpose of convenience only, the rotary shield 6 as applied to a vehicle or craft windshield, it is evident that the device can be applied to any type of window, or in any opening through which one may desire to observe by vision and especially in stormy weather.

Briefly speaking, it is apparent that the invention consists of a transparent vision shield, preferably, although not necessarily, made from glass, means for rotatably supporting said shield in advance of another vision shield, or a mere opening and the provision of means for rotating the shield.

From the foregoing description taken in connection with the drawings, it is apparent that we provide a vision shield which can be kept clean, dry and free from the elements and from insects whether the shield is used in connection with a vehicle, craft, observation tower, window, opening in a wall, or the like.

The many advantages of the herein described invention will readily suggest themselves to those skilled in the art to which it appertains.

We do not wish to be understood as having limited ourselves to the details of construction shown and described, but desire to have it understood that the invention we have shown in the drawings is merely illustrative, as it is manifest that various minor changes may be made in the exact construction and particular arrangement of parts without departing from the spirit of our invention, hence we reserve the right to make any such changes, or modifications as may fairly fall within the scope of the appended claims when fairly construed.

What we claim is:

1. In combination with a vertically disposed pane of glass, a member fixed to the glass having an annular channel providing an internal drain, the outer wall thereof being higher than the inner wall thereof and provided with a flange, said outer wall forming with the pane an outer drain, a shaft, a transparent vision disc fixed to one end of said shaft, a peripheral band fixed to said disc having its inner edge receivable in the annular channel of the aforesaid member to prevent the weather elements from finding access to the rear of said disc and means for rotating said disc for freeing the exposed surface thereof from the elements during stormy weather by centrifugal force and evaporation, thereby establishing clear vision therethrough.

2. In a weather shield for vehicles, craft and the like, a movable transparent member, a shaft one end of which passes through an opening in said member, a support for said shaft, a transparent vision disc fixed to said shaft and positioned in advance of said movable transparent member, means for moving said disc into different positions with relation to the movable member, means for imparting rotary movement to the disc through the medium of said shaft to keep the disc clean of the weather elements and means normally positioned adjacent the periphery of said disc to prevent the access of weather elements to the rear thereof.

3. In combination with a transparent member of a wind shield, an annular channeled guard having L-shaped walls with the corresponding portions of the L-shaped walls extending in the same directions and with the outer wall adapted to form a peripheral drain channel with the transparent member of the wind shield, a transparent rotor, means for supporting said rotor, means for rotating said rotor, a rim fixed to the peripheral face of said rotor and extending beyond the rear face of said rotor and into the channeled guard in close relation to the inner face of the outer wall thereof.

4. A guard for rotary vision shields comprising an annular channeled member with L-shaped walls with the corresponding portions of the L-shaped walls extending in the same directions and with the outer wall adapted to form a drain channel with the transparent member of a windshield.

5. In a rotary shield structure, in combination with the transparent member of a windshield, of an annular channeled member with L-shaped walls with the corresponding portions of the L-shaped walls extending in the same directions and with the outer wall adapted to form a drain channel with the transparent member of a windshield, a transparent rotor disposed within the bounds of the outer wall of the guard, a rim fixed to the peripheral face of said rotor, said rim extending beyond the rear face of the rotor and receivable in the channel of the guard in close relation with the outer wall of the guard.

6. In a windshield structure, a transparent windshield member, a guard fixed to the windshield member and having an annular channel, the inner wall of the guard being provided with a flange providing an internal drain, the outer wall of the guard being longer than the inner wall and provided with a flange, said outer wall forming with the transparent windshield member an outer drain and a rotor disposed to revolve within the bounds of the outer walls of the guard.

7. In a windshield structure, a transparent windshield member, a guard fixed to the windshield member and having an annular channel, the inner wall of the guard being provided with a flange providing an internal drain, the outer wall of the guard being longer than the inner wall and provided with a flange, said outer wall forming with the transparent windshield member an outer drain, a rotor disposed to revolve within the bounds of the outer walls of the guard, a rim fixed to the peripheral face of the rotor extending beyond the rear face of said rotor and into the annular channel of the guard in close relation to the outer wall of the guard.

8. In a windshield structure, in combination with the transparent members of a two piece windshield, a pair of semi-annular channeled guard segments fixed to said transparent members to normally form an annular channeled guard, the inner walls of said guard segments each provided with a flange to normally provide an internal drain, the outer wall of the guard segments being longer than the inner walls and each provided with a flange, said outer walls forming with the transparent members of the windshield an outer drain and a rotor disposed to revolve within the bounds of the outer walls of said guard segments when in register to form an annular channeled guard.

9. In a windshield structure, in combination with the transparent members of a two piece windshield, a pair of semi-annular channeled guard segments fixed to said transparent members to normally form an annular channeled guard, the inner walls of said guard segments each provided with a flange to normally provide an internal drain, the outer wall of the guard segments being longer than the inner walls and each provided with a flange, said outer walls forming with the transparent members of the windshield an outer drain, a rotor disposed to revolve within the bounds of the outer walls of said guard segments when in register to form an annular channeled guard and a peripheral rim fixed to the rotor and normally extending rearwardly into the annular channel of the guard segments in close relation with the outer walls thereof.

10. A guard for rotary vision shields comprising a pair of semi-annular channeled guard segments each with L-shaped walls with the corresponding portions of the L-shaped walls extending in the same directions and with the outer wall of each segment adapted to form a drain channel with the transparent members of a two-piece windshield when in their closed positions.

11. In a rotary shield structure, in combination with the transparent members of a two-piece windshield, of a pair of semi-annular channeled guard segments each with L-shaped walls with the corresponding portions of the L-shaped walls extending in the same directions and with the outer wall of each segment adapted to form a drain channel with the transparent members of a two-piece windshield when in their closed positions, a transparent rotor disposed to be revolved within the bounds of the outer walls of the channeled segments when in registered relation, a rim fixed to the peripheral face of said rotor and extending beyond the rear face of the rotor into the channel of the guard segments and in close relation with the outer walls of the guard segments.

In testimony whereof, we have hereunto signed the specification.

ERWIN O. AEGERTER.
GUSTAVE W. AEGERTER.